US012784209B2

(12) United States Patent
Liu et al.

(10) Patent No.: US 12,784,209 B2
(45) Date of Patent: Nov. 3, 2026

(54) SYSTEM AND METHOD FOR CONVERTING SKIN TISSUE IMAGES BASED ON DEEP LEARNING

(71) Applicant: NATIONAL TAIWAN UNIVERSITY, Taipei City (TW)

(72) Inventors: Chih-Hao Liu, Taichung City (TW); Sheng-Lung Huang, Taipei City (TW)

(73) Assignee: NATIONAL TAIWAN UNIVERSITY, Taipei City (TW)

( * ) Notice: Subject to any disclaimer, the term of this patent is extended or adjusted under 35 U.S.C. 154(b) by 231 days.

(21) Appl. No.: 18/764,110

(22) Filed: Jul. 3, 2024

(65) Prior Publication Data

US 2025/0315945 A1 Oct. 9, 2025

(30) Foreign Application Priority Data

Apr. 9, 2024 (TW) ................................ 113113056

(51) Int. Cl.
*G06T 7/00* (2017.01)

(52) U.S. Cl.
CPC .. *G06T 7/0012* (2013.01); *G06T 2207/10056* (2013.01); *G06T 2207/10101* (2013.01); *G06T 2207/20081* (2013.01); *G06T 2207/30088* (2013.01)

(58) Field of Classification Search
CPC ......... G06T 7/0012–0016; G06T 2207/10056; G06T 2207/10101; G06T 2207/20081; G06T 2207/30088
See application file for complete search history.

(56) References Cited

U.S. PATENT DOCUMENTS

2016/0225149 A1 8/2016 Tearney et al.
2021/0043331 A1* 2/2021 Ozcan ........................ G06T 7/11
2022/0237783 A1* 7/2022 Wong .................... G06T 7/0012
2024/0020955 A1* 1/2024 Frick ....................... G06T 11/10

FOREIGN PATENT DOCUMENTS

CN 112037242 A 12/2020
TW 202404537 A 2/2024

OTHER PUBLICATIONS

Tsai et al H&E-like staining of OCT images of human skin via generative adversarial network Applied Physics letters Sep. 2022 (Year: 2022).*

(Continued)

*Primary Examiner* — Sean T Motsinger
(74) *Attorney, Agent, or Firm* — Li & Cai Intellectual Property Office

(57) ABSTRACT

A system and a method for transforming skin tissue images based on deep learning are provided. The system includes a database, a processing circuit, and a first deep generative model. The database is configured to store an optical coherence tomography (OCT) image set and a stained image set of skin tissue. The processing circuit is coupled to the database. The first deep generative model is established by the processing circuit executing a deep learning process to learn a first mapping relationship from the OCT image set to the stained image set, and the first deep generative model is configured to convert a target OCT image into a virtual stained image.

13 Claims, 7 Drawing Sheets

(56) References Cited

OTHER PUBLICATIONS

Xin Tian et al OCT2CONFOCAL: 3D Cyclegan Based Translation of Retinal OCT Images to Confocalmicroscopy Arvix Feb. 17, 2024 (Year: 2024).*

Chih-Hao Liu et al toward cell nuclei precision between OCT and H&E images translation using signal-to-noise ratio cycle-consistency Computer Methods and Programs in Biomedicine vol. 242, Available online Sep. 25, 2023 (Year: 2023).*

* cited by examiner

SYSTEM AND METHOD FOR CONVERTING SKIN TISSUE IMAGES BASED ON DEEP LEARNING

CROSS-REFERENCE TO RELATED PATENT APPLICATION

This application claims the benefit of priority to Taiwan Patent Application No. 113113056, filed on Apr. 9, 2024. The entire content of the above-identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a system and method for converting skin tissue images, and more particularly to a system and method for converting skin tissue images based on deep learning.

BACKGROUND OF THE DISCLOSURE

Stained images obtained through pathological sections are widely recognized as the authoritative standard for diagnosing and evaluating skin lesions. However, the destructive and time-consuming preparation process can easily cause irreversible effects on the tissue and delay the patient's treatment.

Optical coherence tomography (OCT) provides non-invasive, high-resolution imaging for tissue structures. However, many dermatologists are not familiar with OCT images and still rely on stained images for diagnosis.

SUMMARY OF THE DISCLOSURE

In response to the above-referenced technical inadequacies, the present disclosure provides a system and method for converting skin tissue images based on deep learning, which can convert OCT images of skin tissue into stained images.

In order to solve the above-mentioned problems, one of the technical aspects adopted by the present disclosure is to provide a system for converting skin tissue images based on deep learning, and the system includes a database, a processing circuit and a first deep generation model. The database is configured to store an optical coherence tomography (OCT) image set and a stained image set of skin tissue. The OCT image set includes a plurality of in vivo OCT images with high resolution, and the stained image set includes a plurality of stained images that do not match the plurality of in vivo OCT images. The processing circuit is coupled to the database. The first deep generative model is established by the processing circuit executing a deep learning process to learn a first mapping relationship from the OCT image set to the stained image set, and the first deep generative model is configured to convert a target OCT image into a virtual stained image.

In order to solve the above-mentioned problems, another one of the technical aspects adopted by the present disclosure is to provide a method for transforming skin tissue images based on deep learning, and the method includes: configuring a database to store an OCT image set and a stained image set of skin tissue, in which the OCT image set includes a plurality of in vivo OCT images with high resolution, and the stained image set includes a plurality of stained images that do not match the in vivo OCT images; configuring a processing circuit to execute a deep learning process to learn a first mapping relationship from the OCT image set to the stained image set, so as to establish a first deep generative model; and configuring the first deep generative model to convert a target OCT image into a virtual stained image.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
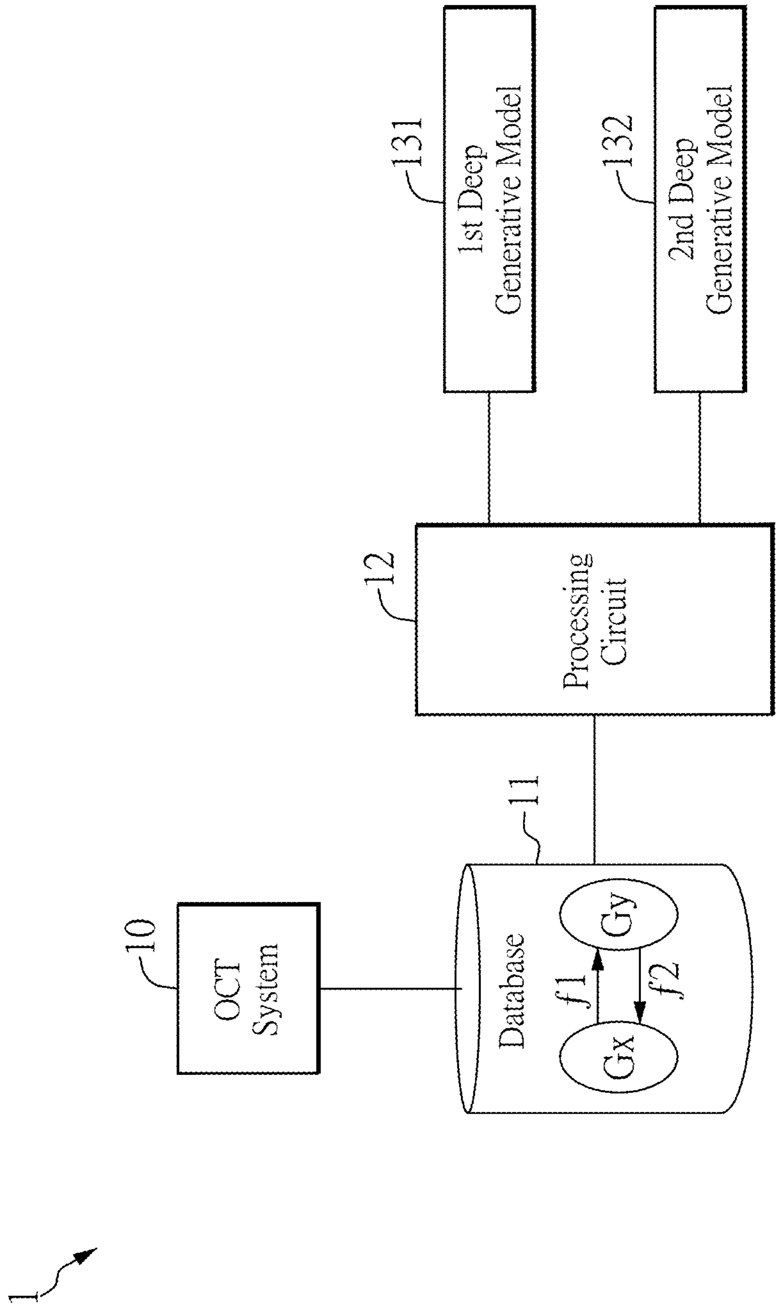
FIG. 1 is a functional block diagram of a system for converting skin tissue images based on deep learning according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Referring FIG. 1, FIG. 1 is a functional block diagram of a system for converting skin tissue images based on deep learning provided by a first embodiment of the present disclosure. As shown in FIG. 1, a system 1 can include a database 11, a processing circuit 12, and a first deep generative model 131.

The database 11 is configured to store an OCT image set Gx and a stained image set Gy of skin tissue. Specifically, the OCT image set Gx includes a plurality of in vivo OCT images with high resolution. These in vivo OCT images can be obtained from various parts of a living body and include both healthy and diseased skin tissue information. Alternatively, these in vivo OCT images can be obtained by an OCT system 10 combined with a Mirau interferometer. Therefore, in the present embodiment, the system 1 can further include OCT system 10.

Furthermore, the OCT system 10 can be a time domain OCT system, a full field OCT system, a swept source OCT system, a dynamic OCT system or a spectral domain OCT system, but the present disclosure is not limited thereto. In addition, a light source used by the OCT system 10 may be a laser diode, a semiconductor laser, or a crystal fiber laser, but the present disclosure is not limited thereto.

For example, in this embodiment, a cerium-doped yttrium aluminum garnet ($Ce^{3+}$:YAG) crystal fiber or a commercial Ti:sapphire laser can be used as the light source of the OCT system 10. When the $Ce^{3+}$:YAG crystal fiber is used as the light source, an axial resolution and a lateral resolution of the OCT system 10 can be 0.45 μm/pixel and 0.2 μm/pixel, respectively. In addition, when the commercial Ti:sapphire laser is used as the light source, the axial resolution and the lateral resolution of the OCT system 10 can be 0.488 μm/pixel and 0.559 μm/pixel, respectively. Therefore, the OCT system 10 of the present embodiment can clearly display a boundary between the dermis and the epidermis of the human body. However, the present disclosure is not limited to the above examples.

The processing circuit 12 is coupled to the database 11, and the first deep generative model 131 is established by the processing circuit 12 executing a deep learning process to learn a first mapping relationship f1 from the OCT image set Gx to the stained image set Gy. Specifically, the processing circuit 12 can be implemented by hardware (e.g., a central processing unit and a memory) in combination with software and/or firmware. However, the specific implementation of the processing circuit 12 is not limited by the present disclosure. According to the above content, the OCT image set Gx can be a domain of the first mapping relationship f1, and the stained image set Gy can be a codomain of the first mapping relationship f1. Therefore, the first depth generation model 131 can be configured to convert OCT images into stained images.

Furthermore, in order to achieve bidirectional conversion between the OCT images and the stained images, the system 1 can further include a second deep generative model 132. The second deep generative model 132 is established by the processing circuit 12 executing the deep learning process to learn a second mapping relationship f2 from the stained image set Gy to the OCT image set Gx. According to the above content, the stained image set Gy can be a domain of the second mapping relationship f2, and the OCT image set Gx can be a codomain of the second mapping relationship f2. Therefore, the second deep generative model 132 can be configured to convert the stained images into the OCT images.

In other words, the system 1 can utilize the first deep generative model 131 and the second deep generative model 132 to perform bidirectional conversion between the OCT images and the stained images. It should be understood that since it is not possible to obtain stained images from living tissues, the stained image set Gy includes a plurality of stained images that do not match the aforementioned plurality of in vivo OCT images. That is, the present disclosure utilizes unpaired images for training. In addition, the stained images of pathology slides usually provide richer information and clearer features than OCT images, which makes converting OCT images to stained images more challenging than converting stained images to OCT images. Therefore, the processing circuit 12 can also use image pre-processing technology to remove noise from the OCT images, and use intensity normalization technology to enhance the visibility of lower regions (e.g., dermis layer and basal cell layer).

Figure 2:
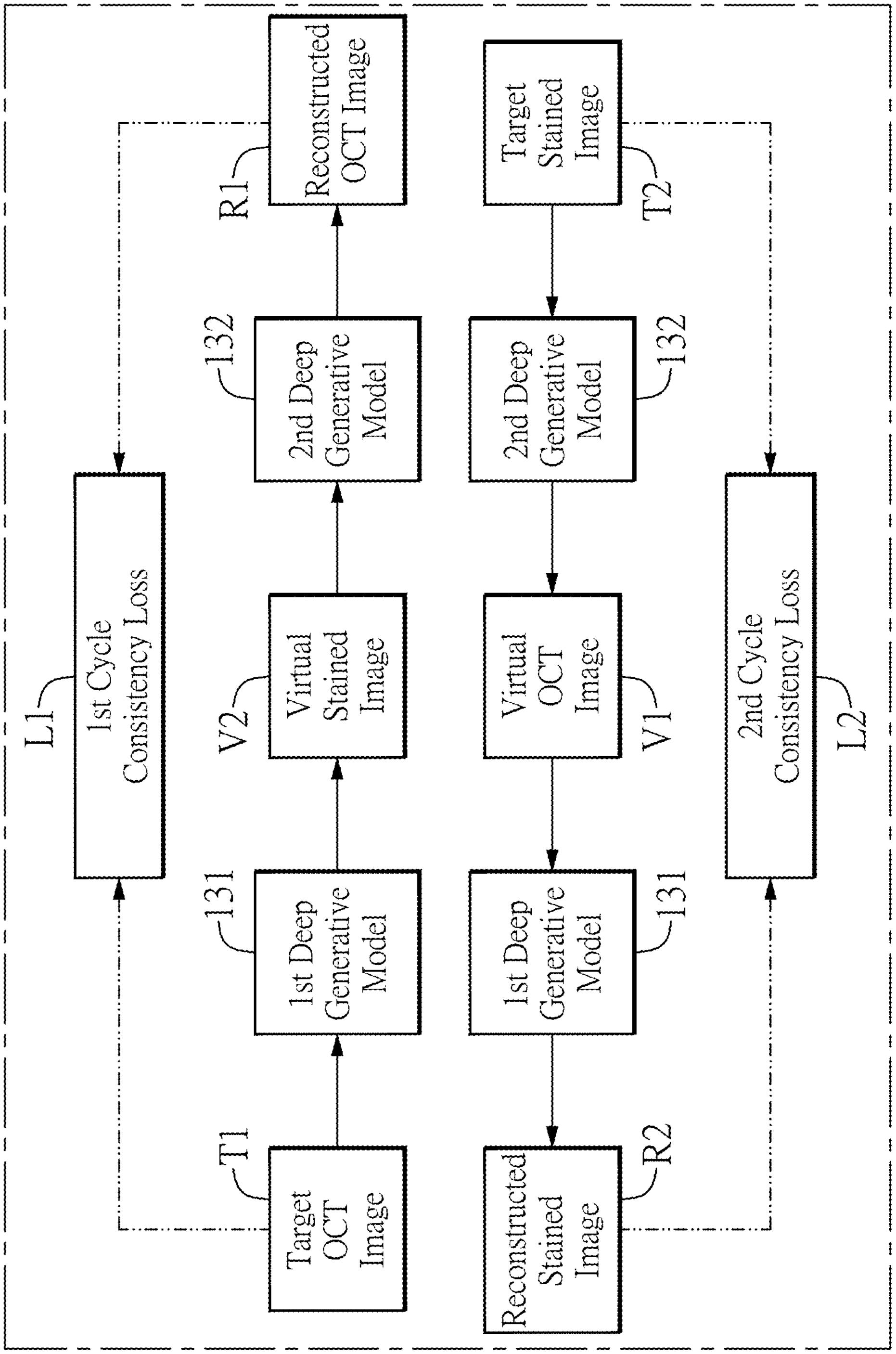
FIG. 2 is a schematic diagram of the system of the first embodiment of the present disclosure using a deep generative model to perform bidirectional conversion between OCT images and stained images.

Referring to FIG. 2, FIG. 2 is a schematic diagram of the system of the first embodiment of the present disclosure using a deep generative model to perform bidirectional conversion between OCT images and stained images. As shown in FIG. 2, the first deep generative model 131 can be configured to convert a target OCT image T1 into a virtual stained image V2, and the second deep generative model 132 can be configured to convert a target stained image T2 into a virtual OCT image V1. Specifically, the target OCT image T1 can be an in vivo OCT image obtained by the OCT system 10 in real-time, and the stained image (including the target stained image T2 and the virtual stained image V2) of the present embodiment can be a hematoxylin and eosin (H&E) stained image, a toluidine blue image, or an immunohistochemistry image.

Furthermore, the deep generative model of the present embodiment can be a generative adversarial network, a variational autoencoder, a flow-based generative model, or a denoising diffusion probabilistic model, but the present disclosure is not limited thereto. In addition, the system 1 can also introduce a cyclic consistency normalization technique to confirm the consistency between the converted image and the original image. Therefore, as shown in FIG. 2, the second deep generative model 132 can be further configured to convert the virtual stained image V2 into a reconstructed OCT image R1, and the processing circuit 12 can be further configured to calculate and obtain a first cycle consistency loss L1 according to the target OCT image T1 and the reconstructed OCT image R1.

Similarly, the first deep generative model 131 can also be configured to convert the virtual OCT image V1 into a reconstructed stained image R2, and the processing circuit 12 can also be configured to calculate and obtain a second cycle consistency loss L2 according to the target stained image T2 and the reconstructed stained image R2. However, confirming the consistency between the converted image and the original image through observing the cycle consistency loss is a common technical means in the art; therefore, further details thereof will not be elaborated herein.

Furthermore, the first deep generative model 131 and the second deep generative model 132 can learn in an unsupervised mode or an assisted mode. When the first deep generative model 131 and the second deep generative model 132 learn in the unsupervised mode, the first deep generative model 131 does not utilize annotation information to learn the first mapping relationship f1 from the OCT image set Gx to the stained image set Gy, and the second depth generation model 132 does not utilize annotation information to learn the second mapping relationship f2 from the stained image set Gy to the OCT image set Gx. In addition, the first deep generative model 131 and the second deep generative model 132 can also learn through adversarial training.

Figure 3:
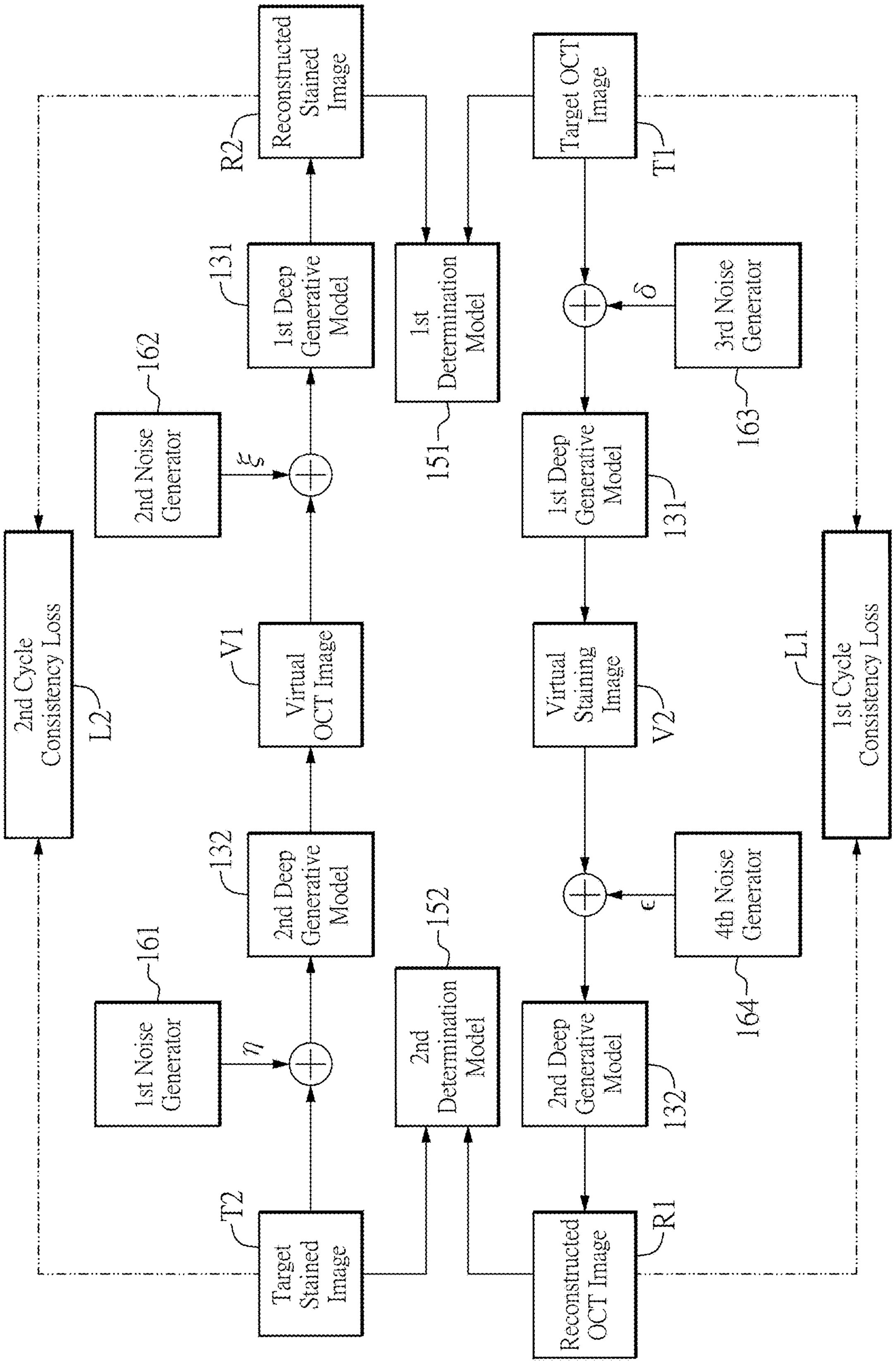
FIG. 3 is a schematic diagram of the system of the first embodiment of the present disclosure using a deep generative model with adversarial learning to perform bidirectional conversion between OCT images and stained images.

Referring to FIG. 3, FIG. 3 is a schematic diagram of the system of the first embodiment of the present disclosure using a deep generative model with adversarial learning to perform bidirectional conversion between OCT images and stained images. As shown in FIG. 3, when the first deep generative model 131 and the second deep generative model 132 utilize adversarial learning, the system 1 can further include a first determination model 151 and a second determination model 152. Specifically, the first determination model 151 can be configured to determine a decision surface between the target OCT image T1 and the virtual OCT image V1 based on the target OCT image T1 and the virtual OCT image V1. In addition, the second determination model 152 can be configured to determine a decision surface between the target stained image T2 and the virtual stained image V2 according to the target stained image T2 and the virtual stained image V2.

According to the above content, the first determination model 151 and the second determination model 152 can respectively contribute to the adversarial learning of the first deep generative model 131 and the second deep generative model 132. Since the principle of how the determination models contribute to the adversarial learning of the deep generative model is already known to those skilled in the art, the details thereof will not be elaborated herein. In addition, the OCT images often have speckle noise and easily lead to intensity discontinuity during the mosaicing or stitching process. There are also significant differences between the stained images and the OCT images. Therefore, in the present disclosure, different types of random noise can be added to the aforementioned four images (i.e., the target stained image T2, the virtual OCT image V1, the target OCT image T1, and the virtual stained image V2) to enhance the robustness of the models and improve the quality of image conversion.

In other words, the system 1 can further include a first noise generator 161, a second noise generator 162, a third noise generator 163, and a fourth noise generator 164. As shown in FIG. 3, the first noise generator 161 is configured to generate a first random noise $\eta$ added to the target stained image T2, and the second noise generator 162 is configured to generate a second random noise $\xi$ added to the virtual OCT image V1. In addition, the third noise generator 163 is configured to generate a third random noise $\delta$ added to the target OCT image T1, and the fourth noise generator 164 is configured to generate a fourth random noise $\epsilon$ added to the virtual stained image V2. In this embodiment, the aforementioned four types of random noise can also respectively have excessive blurring features and beneficial effects of defending against adversarial attacks, reducing speckle noise, and stabilizing reverse conversion.

On the other hand, as mentioned above, the first deep generative model 131 and the second deep generative model 132 can also learn in an auxiliary mode. When the first deep generative model 131 and the second deep generative model 132 are learning in the auxiliary mode, the first deep generative model 131 utilizes the annotation information to learn the first mapping relationship f1 from the OCT image set Gx to the stained image set Gy, and the second deep generative model 132 utilizes the annotation information to learn the second mapping relationship f2 from the stained image set Gy to the OCT image set Gx. Specifically, the aforementioned annotation information can be a statement added to the image by humans to explain or emphasize specific features such as boundaries among stratum corneum, dermis and epidermis, nuclei of keratinocytes, blood vessels and melanin clusters, but the present disclosure is not limited thereto.

Figure 4:
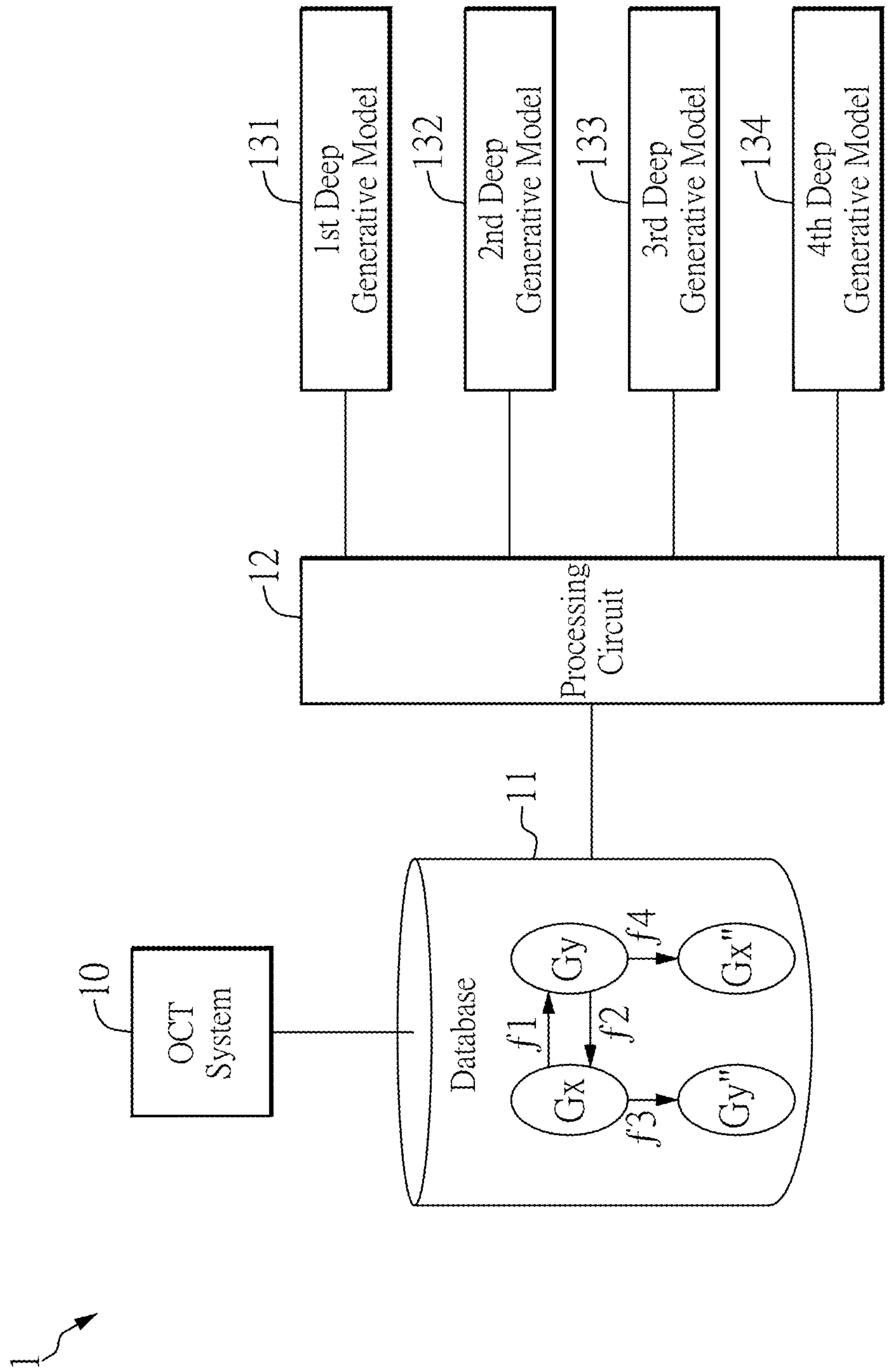
FIG. 4 is a functional block diagram of a system for converting skin tissue images based on deep learning according to a second embodiment of the present disclosure.
Figure 5A:
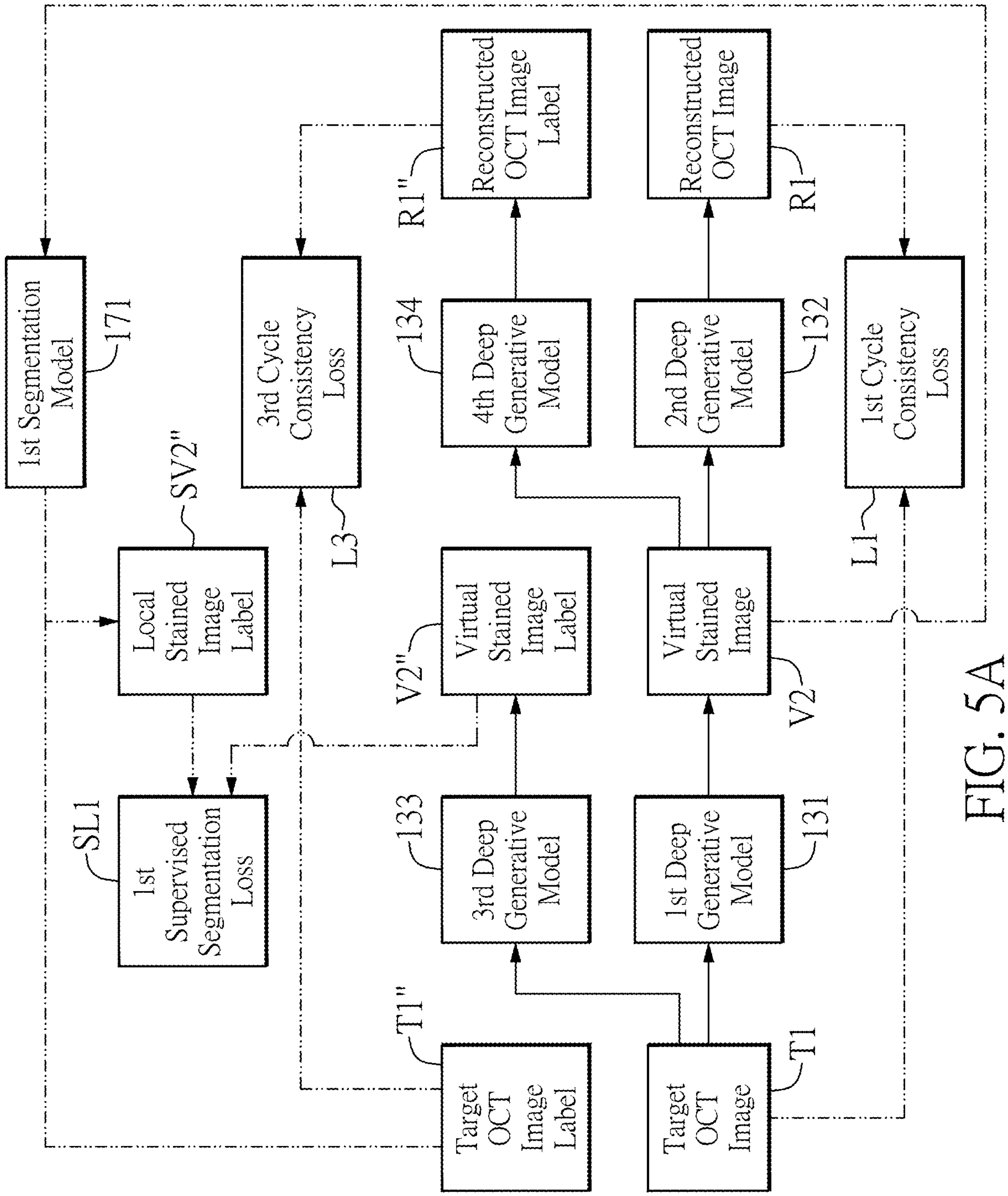
FIG. 5A and FIG. 5B are schematic diagrams of the system of the second embodiment of the present disclosure using a deep generative model to perform bidirectional conversion between OCT images and stained images.
Figure 5B:
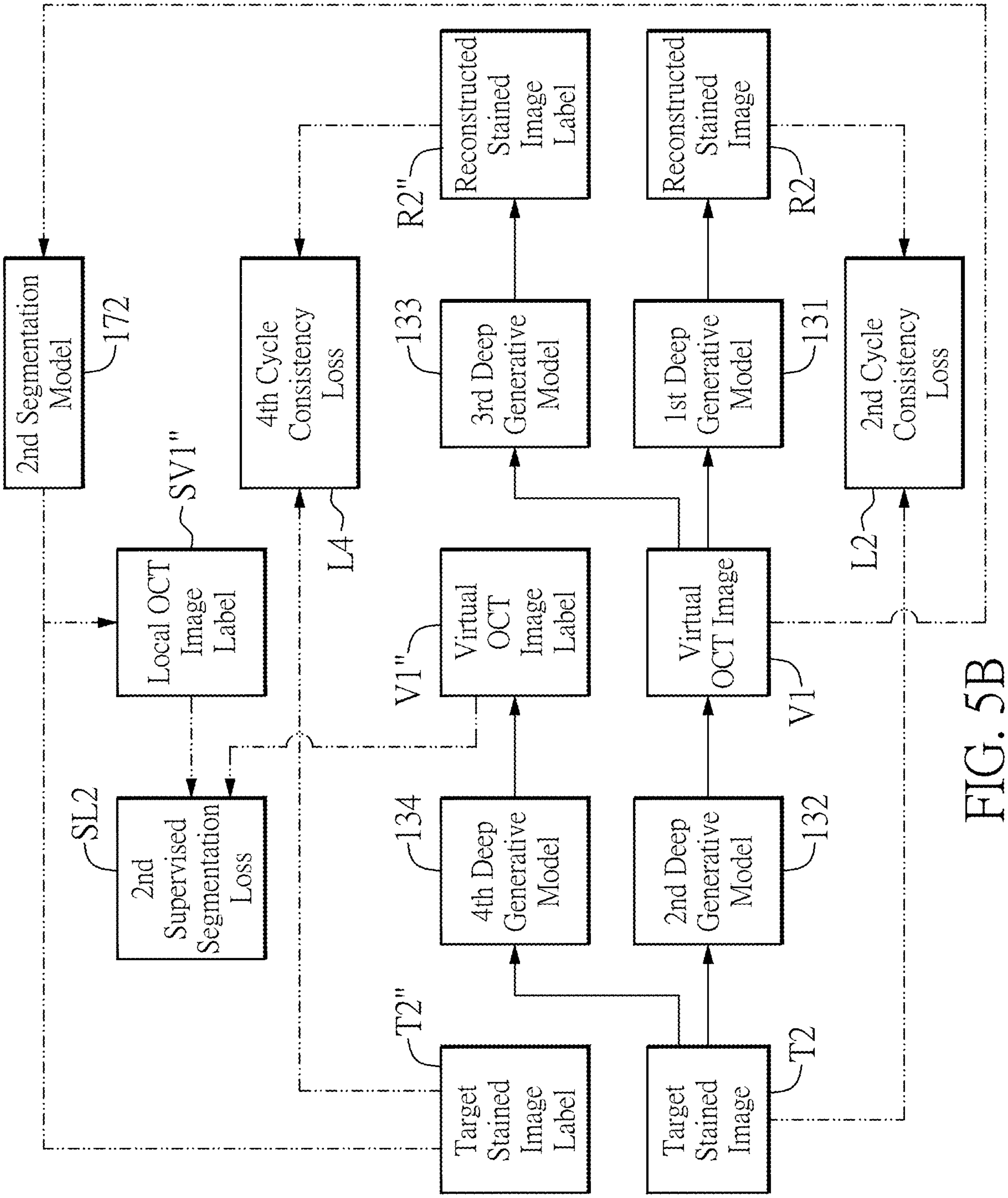

Referring to FIGS. 4, 5A and 5B, FIG. 4 is a functional block diagram of a system for converting skin tissue images based on deep learning provided by a second embodiment of the present disclosure, and FIG. 5A and FIG. 5B are schematic diagrams of the system of the second embodiment of the present disclosure using a deep generative model to perform bidirectional conversion between OCT images and stained images. As shown in FIG. 4, when the first deep generative model 131 and the second deep generative model 132 are learning in the auxiliary mode, the database 11 can also be configured to store an OCT image label set Gx" and a stained image label set Gy" corresponding to the OCT image set Gx and the stained image set Gy, respectively, and the system 1 can also include a third deep generative model 133 and a fourth deep generative model 134.

The third deep generative model 133 is established by the processing circuit 12 executing the deep learning process to learn a third mapping relationship f3 from the OCT image set Gx to the stained image label set Gy", and the fourth deep generative model 134 is established by the processing circuit 12 executing the deep learning process to learn the fourth mapping relationship f4 from the stained image set Gy to the OCT image label set Gx". Therefore, as shown in FIGS. 5A and 5B, according to the above content, the third deep generative model 133 can be configured to convert the target OCT image T1 into a virtual stained image label V2", and the fourth deep generative model 134 can be configured to convert the target stained image T2 into a virtual OCT image label V1".

Furthermore, the system 1 can also receive a target OCT image label T1" and a target stained image label T2" corresponding to the target OCT image T1 and the target stained image T2, respectively. Therefore, in order to confirm the consistency between the converted image label and the original image label, the fourth deep generative model 134 can also be configured to convert the virtual stained image V2 into a reconstructed OCT image label R1", and the processing circuit 12 can also be configured to calculate and obtain a third cycle consistency loss L3 according to the target OCT image label T1" and the reconstructed OCT image label R1".

Similarly, the third deep generative model 133 can also be configured to convert the virtual OCT image V1 into a reconstructed stained image label R2", and the processing circuit 12 can also be configured to calculate and obtain a fourth loop consistency loss L4 according to the target stained image label T2" and the reconstructed stained image label R2". As the relevant details of calculating and obtaining the fourth loop consistency loss L4 have been mentioned as above, they will not be further elaborated herein.

Furthermore, the third deep generative model 133 and the fourth deep generative model 134 can also learn based on a supervised segmentation loss. Therefore, the system 1 can further include a first segmentation model 171 and a second segmentation model 172 for segmenting the virtual stained image V2 and the virtual OCT image V1, respectively. In addition, the system 1 can also generate a local stained image label SV2" based on the target OCT image label T1" and the segmented local virtual stained image (not shown in FIG. 5A and FIG. 5B).

Similarly, the system 1 can also generate a local OCT image label SV1" based on the target stained image label T2" and the segmented local virtual OCT image (also not shown in FIG. 5A and FIG. 5B). In addition, the processing circuit 12 can be further configured to calculate and obtain a first supervised segmentation loss SL1 according to the virtual stained image label V2" and the local stained image label SV2", and can be configured to calculate and obtain a second supervised segmentation loss SL2 according to the virtual OCT image label V1" and the local OCT image label SV1". Since the principles of deep generative models learning based on supervised segmentation loss is already known to those skilled in the art, details thereof will not be elaborated herein.

It should be noted that the system 1 can further include other determination models to facilitate adversarial learning of the local OCT images and the local stained images. In addition, in order to improve the accuracy of image conversion, the system 1 can further include two discriminators (also not shown in FIGS. 5A and 5B) for calculating and obtaining a confrontation loss between the local target OCT image and the local virtual OCT image, and calculating an adversarial loss between the local target stained image and the local reconstructed stained image.

Figure 6:
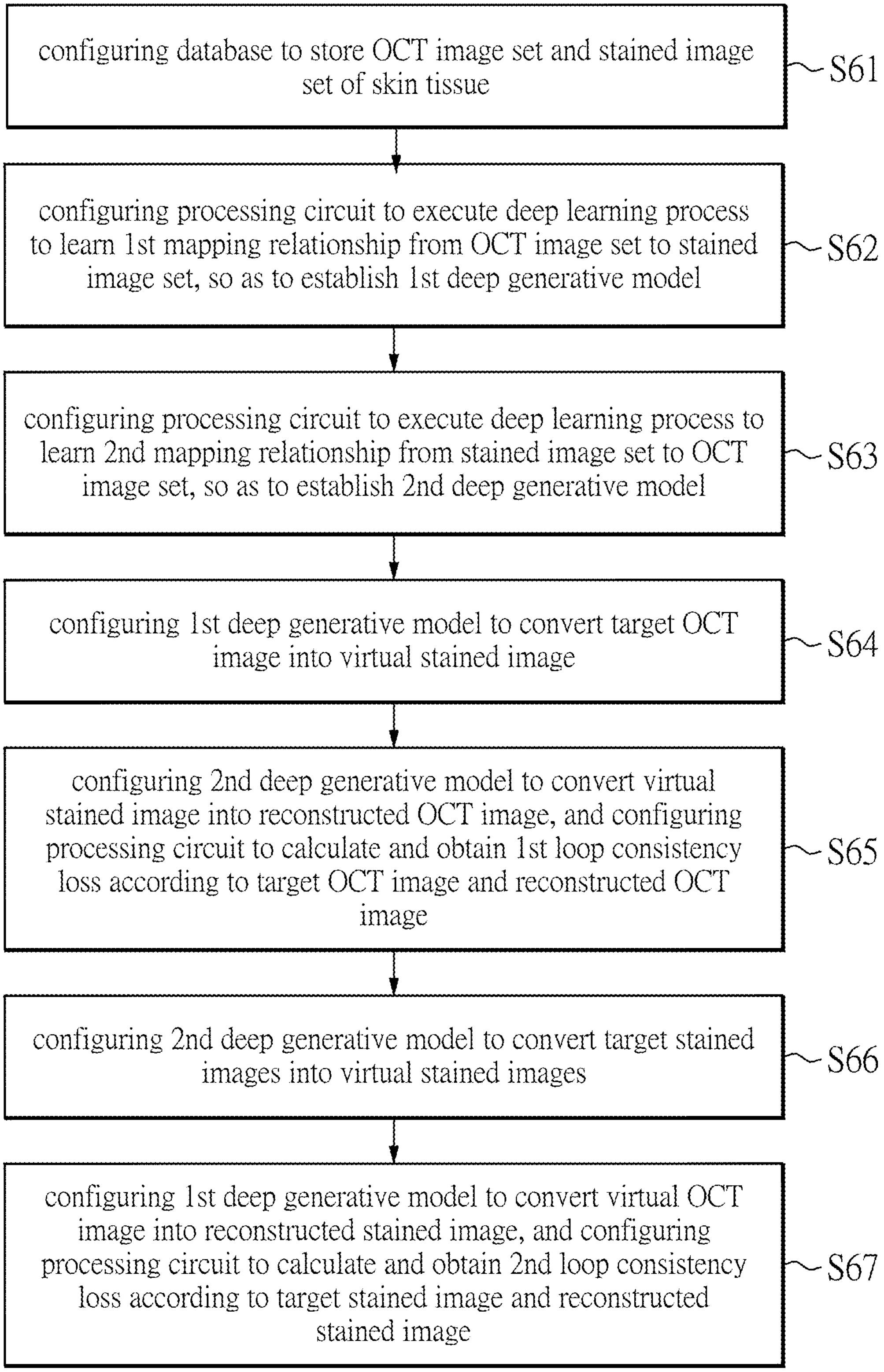
FIG. 6 is a flowchart of a method for converting skin tissue images based on deep learning according to one embodiment of the present disclosure.

Referring to FIG. 6, FIG. 6 is a flowchart of a method for converting skin tissue images based on deep learning provided by one embodiment of the present disclosure. As shown in FIG. 6, according to the above content, the method of the present embodiment can at least include the following steps.

Step S61: configuring the database to store an OCT image set and a stained image set of skin tissue. As described above, the OCT image set includes a plurality of in vivo OCT images with high resolution, and the stained image set includes a plurality of stained images that do not match the plurality of in vivo OCT images.

Step S62: configuring the processing circuit to execute the deep learning process to learn the first mapping relationship from the OCT image set to the stained image set, so as to establish the first deep generative model.

Step S64: configuring the first deep generative model to convert a target OCT image into a virtual stained image.

Furthermore, in order to achieve bidirectional conversion between OCT images and stained images, the method of the present embodiment can further include the following steps.

Step S63: configuring the processing circuit to execute the deep learning process to learn a second mapping relationship from the stained image set to the OCT image set, so as to establish a second deep generative model.

Step S66: configuring the second deep generative model to convert target stained images into virtual stained images.

On the other hand, in order to confirm the consistency between the converted images and the original images, the method of the present embodiment can further include the following steps.

Step S65: configuring the second deep generative model to convert the virtual stained image into a reconstructed OCT image, and configuring the processing circuit to calculate and obtain a first loop consistency loss according to the target OCT image and the reconstructed OCT image.

Step S67: configuring the first deep generative model to convert the virtual OCT image into a reconstructed stained image, and configuring the processing circuit to calculate and obtain a second loop consistency loss according to the target stained image and the reconstructed stained image. As the relevant details of steps S61 to S67 have been mentioned as above, they will not be further elaborated herein.

In conclusion, in the system and method for converting the skin tissue images based on the deep learning provided by the present disclosure, by virtue of "executing the deep learning process to learn the first mapping relationship from the OCT image set to the stained image set to establish the first deep generative model" and "the first deep generative model is configured to convert the target OCT image into the virtual stained image," dermatologists' understanding of the relationship between OCT images and stained images can be enhanced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system for converting skin tissue images based on deep learning, the system comprising:

a database configured to store an optical coherence tomography (OCT) image set and a stained image set of skin tissue, wherein the OCT image set includes a plurality of in vivo OCT images with high resolution, and the stained image set includes a plurality of stained images that do not match the plurality of in vivo OCT images;

a processing circuit coupled to the database;

a first deep generative model established by the processing circuit executing a deep learning process to learn a first mapping relationship from the OCT image set to the stained image set, and the first deep generative model is configured to convert a target OCT image into a virtual stained image;

a second deep generative model established by the processing circuit executing the deep learning process to learn a second mapping relationship from the stained image set to the OCT image set, and the second deep generative model is configured to convert a target stained image into a virtual OCT image, wherein the database is further configured to store an OCT image label set and a stained image label set corresponding to the OCT image set and the stained image set, respectively;

a third deep generative model established by the processing circuit executing the deep learning process to learn a third mapping relationship from the OCT image set to the stained image label set, and the third deep generative model is configured to convert the target OCT image into a virtual stained image label; and a fourth deep generative model established by the processing circuit executing the deep learning process to learn a fourth mapping relationship from the stained image set to the OCT image label set, and the fourth deep generative model is configured to convert the target stained image into a virtual OCT image label.

2. The system according to claim 1, wherein the second deep generative model is further configured to convert the virtual stained image into a reconstructed OCT image, and the processing circuit is further configured to calculate and obtain a first cycle consistency loss according to the target OCT image and the reconstructed OCT image.

3. The system according to claim 2, wherein the first deep generative model is further configured to convert the virtual OCT image into a reconstructed stained image, and the processing circuit is further configured to calculate and obtain a second cycle consistency loss according to the target stained image and the reconstructed stained image.

4. The system according to claim 1, further comprising:

a first noise generator configured to generate a first random noise added to the target stained image;

a second noise generator configured to generate a second random noise added to the virtual OCT image;

a third noise generator configured to generate a third random noise added to the target OCT image; and a fourth noise generator configured to generate a fourth random noise added to the virtual stained image.

5. The system according to claim 1, wherein the first deep generative model and the second deep generative model learn in an unsupervised mode or an auxiliary mode.

6. The system according to claim 5, wherein, when the first deep generative model and the second deep generative model are learning in the unsupervised mode, the first deep generative model does not utilize annotation information to learn the first mapping relationship from the OCT image set to the stained image set, and the second deep generative model does not utilize the annotation information to learn the second mapping relationship from the stained image set to the OCT image set.

7. The system according to claim 6, wherein, when the first deep generative model and the second deep generative model are learning in the auxiliary mode, the first deep generative model uses the annotation information to learn the first mapping relationship from the OCT image set to the stained image set, and the second deep generative model utilizes the annotation information to learn the second mapping relationship from the stained image set to the OCT image set.

8. The system according to claim 1, wherein the fourth deep generative model is further configured to convert the virtual stained image into a reconstructed OCT image label, and the processing circuit is further configured to calculate and obtain a third cycle consistency loss according to a target OCT image label and the reconstructed OCT image label.

9. The system according to claim 8, wherein the third deep generative model is further configured to convert the virtual OCT image into a reconstructed stained image label, and the processing circuit is further configured to calculate and obtain a fourth cycle consistency loss based on a target stained image label and the reconstructed stained image label.

10. The system according to claim 1, wherein the plurality of in vivo OCT images are obtained by an OCT system combined with a Mirau interferometer.

11. A method for transforming skin tissue images based on deep learning, the method comprising:

configuring a database to store an OCT image set and a stained image set of skin tissue, wherein the OCT image set includes a plurality of in vivo OCT images with high resolution, and the stained image set includes a plurality of stained images that do not match the in vivo OCT images, wherein the database is further configured to store an OCT image label set and a stained image label set corresponding to the OCT image set and the stained image set, respectively;

configuring a processing circuit to execute a deep learning process to learn a first mapping relationship from the OCT image set to the stained image set, so as to establish a first deep generative model, and to execute the deep learning process to learn a second mapping relationship from the stained image set to the OCT image set, so as to establish a second deep generative model; and configuring the processing circuit to execute the deep learning process to learn a third mapping relationship from the OCT image set to the stained image label set, so as to establish a third deep generative model, and to learn a fourth mapping relationship from the stained image set to the OCT image label set, so as to establish a fourth deep generative model;

configuring the first deep generative model to convert a target OCT image into a virtual stained image;

configuring the second deep generative model to convert a target stained image into a virtual OCT image;

configuring the third deep generative model to convert the target OCT image into a virtual stained image label; and configuring the fourth deep generative model to convert the target stained image into a virtual OCT image label.

12. The method of claim 11, further comprising:

configuring the second deep generative model to convert the virtual stained image into a reconstructed OCT image; and configuring the processing circuit to calculate and obtain a first cycle consistency loss according to the target OCT image and the reconstructed OCT image.

13. The method according to claim 12, further comprising:

configuring the first deep generative model to convert the virtual OCT image into a reconstructed stained image; and configuring the processing circuit to calculate and obtain a second cycle consistency loss according to the target stained image and the reconstructed stained image.

* * * * *